(12) United States Patent
Park et al.

(10) Patent No.: US 12,245,168 B2
(45) Date of Patent: Mar. 4, 2025

(54) ELECTRONIC DEVICE AND METHOD OF CONTROLLING TRANSMISSION POWER IN ELECTRONIC DEVICE SUPPORTING CARRIER AGGREGATION

(71) Applicant: SAMSUNG ELECTRONICS CO., LTD., Suwon-si (KR)

(72) Inventors: Taeyang Park, Suwon-si (KR); Dooyoung Kim, Suwon-si (KR); Dongjae Shin, Suwon-si (KR); Euichang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 697 days.

(21) Appl. No.: 17/565,350

(22) Filed: Dec. 29, 2021

(65) Prior Publication Data

US 2022/0210750 A1 Jun. 30, 2022

Related U.S. Application Data

(63) Continuation of application No. PCT/KR2021/019966, filed on Dec. 27, 2021.

(30) Foreign Application Priority Data

Dec. 29, 2020 (KR) .................. 10-2020-0185968

(51) Int. Cl.
*H04L 5/00* (2006.01)
*H04L 1/00* (2006.01)
(Continued)

(52) U.S. Cl.
CPC ......... *H04W 52/367* (2013.01); *H04L 1/0003* (2013.01); *H04L 5/0051* (2013.01); *H04W 52/242* (2013.01)

(58) Field of Classification Search
CPC ............ H04W 52/367; H04W 52/242; H04W 52/325; H04W 52/346; H04L 1/0003; H04L 5/0051; H04L 5/0001; H04L 1/0009

See application file for complete search history.

(56) References Cited

U.S. PATENT DOCUMENTS

2011/0275403 A1 11/2011 Chen et al.
2014/0321304 A1* 10/2014 Yu .......................... H04W 72/02
370/252

(Continued)

FOREIGN PATENT DOCUMENTS

EP 3209053 8/2017
KR 10-2013-0038268 4/2013

(Continued)

OTHER PUBLICATIONS

Search Report and Written Opinion issued Mar. 25, 2022 in counterpart International Patent Application No. PCT/ KR2021/019966.

*Primary Examiner* — Joseph E Dean, Jr.
(74) *Attorney, Agent, or Firm* — Nixon & Vanderhye, P.C.

(57) ABSTRACT

According to various embodiments, an electronic device may include: a communication processor, at least one radio frequency integrated circuit (RFIC) connected to the communication processor, and at least one antenna, each of which is connected to the at least one RFIC via at least one radio frequency front-end (RFFE) circuit, and is configured to transmit or receive a signal corresponding to at least one communication network, wherein the communication processor is configured to: identify whether target power corresponding to a primary component carrier (PCC) exceeds maximum transmission power of the electronic device while performing uplink carrier aggregation (CA), and based on identifying that the target power corresponding to the PCC (Continued)

exceeds the maximum transmission power, set a first transmission power of the PCC to a first power less than the maximum transmission power and set a second transmission power of at least one secondary component carrier (SCC) to a second power less than the first power, based on a first spectral efficiency corresponding to the first transmission power of the PCC and a second spectral efficiency corresponding to the second transmission power of the at least one SCC.

20 Claims, 12 Drawing Sheets

(51) Int. Cl.
*H04W 52/24* (2009.01)
*H04W 52/32* (2009.01)
*H04W 52/36* (2009.01)

(56) References Cited

U.S. PATENT DOCUMENTS

| | | |
|---|---|---|
| 2015/0341156 A1 | 11/2015 | Yang et al. |
| 2016/0100420 A1 | 4/2016 | Chen et al. |
| 2016/0255665 A1 | 9/2016 | Futaki |
| 2016/0353387 A1 | 12/2016 | Gao et al. |
| 2017/0164356 A1 | 6/2017 | Kakishima et al. |
| 2018/0049139 A1 | 2/2018 | Lim et al. |
| 2019/0159134 A1 | 5/2019 | Wang et al. |
| 2019/0159140 A1* | 5/2019 | Wang .................... H04W 72/23 |
| 2021/0105084 A1* | 4/2021 | Gulati .................... H04L 1/007 |
| 2021/0194652 A1* | 6/2021 | Khoryaev ................ H04L 5/06 |

FOREIGN PATENT DOCUMENTS

| | | |
|---|---|---|
| KR | 10-2015-0105352 | 9/2015 |
| KR | 10-2016-0107293 | 9/2016 |
| KR | 10-2017-0121207 | 11/2017 |
| KR | 10-2020-0086680 | 7/2020 |

* cited by examiner

ELECTRONIC DEVICE AND METHOD OF CONTROLLING TRANSMISSION POWER IN ELECTRONIC DEVICE SUPPORTING CARRIER AGGREGATION

CROSS-REFERENCE TO RELATED APPLICATIONS

This application is a continuation of International Application No. PCT/KR2021/019966 designating the United States, filed on Dec. 27, 2021, in the Korean Intellectual Property Receiving Office and claiming priority to Korean Patent Application No. 10-2020-0185968, filed on Dec. 29, 2020, in the Korean Intellectual Property Office, the disclosures of which are incorporated by reference herein in their entireties.

BACKGROUND

Field

The disclosure relates to an electronic device and a method of controlling transmission power in an electronic device that supports carrier aggregation.

Description of Related Art

As mobile communication technologies are developed, a portable terminal that provides various functions has become popular. Accordingly, an effort to develop a 5G communication system is being made in order to meet wireless data traffic demand which is increasing. In addition to implementation in a frequency band that the 3G communication system and the long term evolution (LTE) communication system used to use, implementation of the 5G communication system in a higher frequency band (e.g., 25 to 60 GHz band) is being considered in order to provide high data transmission speed for high data transmission rate.

In the 5G communication system, technologies such as beamforming, massive MIMO, full dimensional MIMO (FD-MIMO), an array antenna, analog beam-forming, and a large scale antenna are discussed to mitigate a propagation path loss in the mmWave band and to increase a propagation transmission distance.

As a method of implementing 5G communication, a standalone (SA) scheme and a non-standalone (NSA) scheme are being considered. Among them, the SA scheme may be a scheme that uses only a new radio (NR) system, and the NAS scheme may be a scheme that uses the NR system together with the legacy LTE system. In the NSA scheme, a user equipment (UE) may use an eNB in an LTE system, and a gNB in the NR system. A technology in which a UE enables different communication systems is referred to as dual connectivity.

An electronic device may configure uplink carrier aggregation (CA), and may transmit data via a plurality of component carriers (CC), thereby providing a high data transmission rate (data rate) (e.g., throughput (TP)). For example, the electronic device may be assigned with a single or multiple frequency bandwidths among all allocable bandwidths for data transmission or reception, and may transmit the data by aggregating the multiple bandwidths, thereby providing a high data rate.

The electronic device may control, based on target power required by a base station, the power of a transmission signal within the maximum transmission power which is capable of being transmitted by the electronic device. If the target power that the base station requires is higher than the maximum transmission power set for the electronic device, the power of a transmission signal transmitted by the electronic device may be limited within the set maximum transmission power. For example, while an electronic device that supports uplink CA activates an uplink CA function and transmits data, the sum of the target power of a transmission signal transmitted via a PCC and the target power of a transmission signal transmitted via at least one SCC may exceed the maximum transmission power of the electronic device. In this instance, if the PCC has a higher priority than the SCC in association with power distribution, the electronic device may perform control so that a transmission signal is transmitted only via the PCC and a transmission signal is not transmitted via the SCC. If a transmission signal is transmitted only via the PCC, the transmission performance may deteriorate when compared to data transmission via distribution to the PCC and the SCC.

SUMMARY

Embodiments of the disclosure provide an electronic device and a method of controlling transmission power in an electronic device that supports carrier aggregation, which can set the transmission power of a PCC and an SCC so that the overall throughput of the electronic device is improved based on the sum of the target power of a transmission signal transmitted via a PCC and the target power of a transmission signal transmitted via at least one SCC exceeding the maximum transmission power set for the electronic device, while the electronic device performs an uplink CA operation.

According to an example embodiment of the disclosure, an electronic device may include: a communication processor, at least one radio frequency integrated circuit (RFIC) connected to the communication processor, and at least one antenna, each of which is connected to the at least one RFIC via at least one radio frequency front-end (RFFE) circuit, and is configured to transmit and/or receive a signal corresponding to at least one communication network, wherein the communication processor is configured to: identify whether target power corresponding to a primary component carrier (PCC) exceeds a maximum transmission power of the electronic device while performing uplink carrier aggregation (CA), and based on identifying that the target power corresponding to the PCC exceeds the maximum transmission power, set a first transmission power of the PCC to a first power less than the maximum transmission power and set a second transmission power of at least one secondary component carrier (SCC) to a second power less than the first power based on a first spectral efficiency corresponding to the first transmission power of the PCC and a second spectral efficiency corresponding to the second transmission power of the at least one SCC.

According to an example embodiment of the disclosure, a method of operating an electronic device may include: activating an uplink carrier aggregation (CA); identifying whether a target power corresponding to a primary component carrier (PCC) exceeds a maximum transmission power of the electronic device, while performing uplink CA; and based on identifying that the target power corresponding to the PCC exceeds the maximum transmission power, setting the first transmission power of the PCC to a first power less than the maximum transmission power and setting the second transmission power of at least one secondary component carrier (SCC) to a second power less than the first power, based on a first spectral efficiency corresponding to the first transmission power of the PCC and a second spectral efficiency corresponding to the at least one SCC.

According to various example embodiments, the overall throughput (e.g., the spectral efficiency or data transmission rate) of an electronic device may be improved by decreasing the transmission power of a PCC by a set value and increasing the transmission power of at least one SCC by a set value if the sum of the target power of a transmission signal transmitted via the PCC and the target power of a transmission signal transmitted via the at least one SCC exceeds the maximum transmission power set for the electronic device, while the electronic device performs uplink CA operation.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
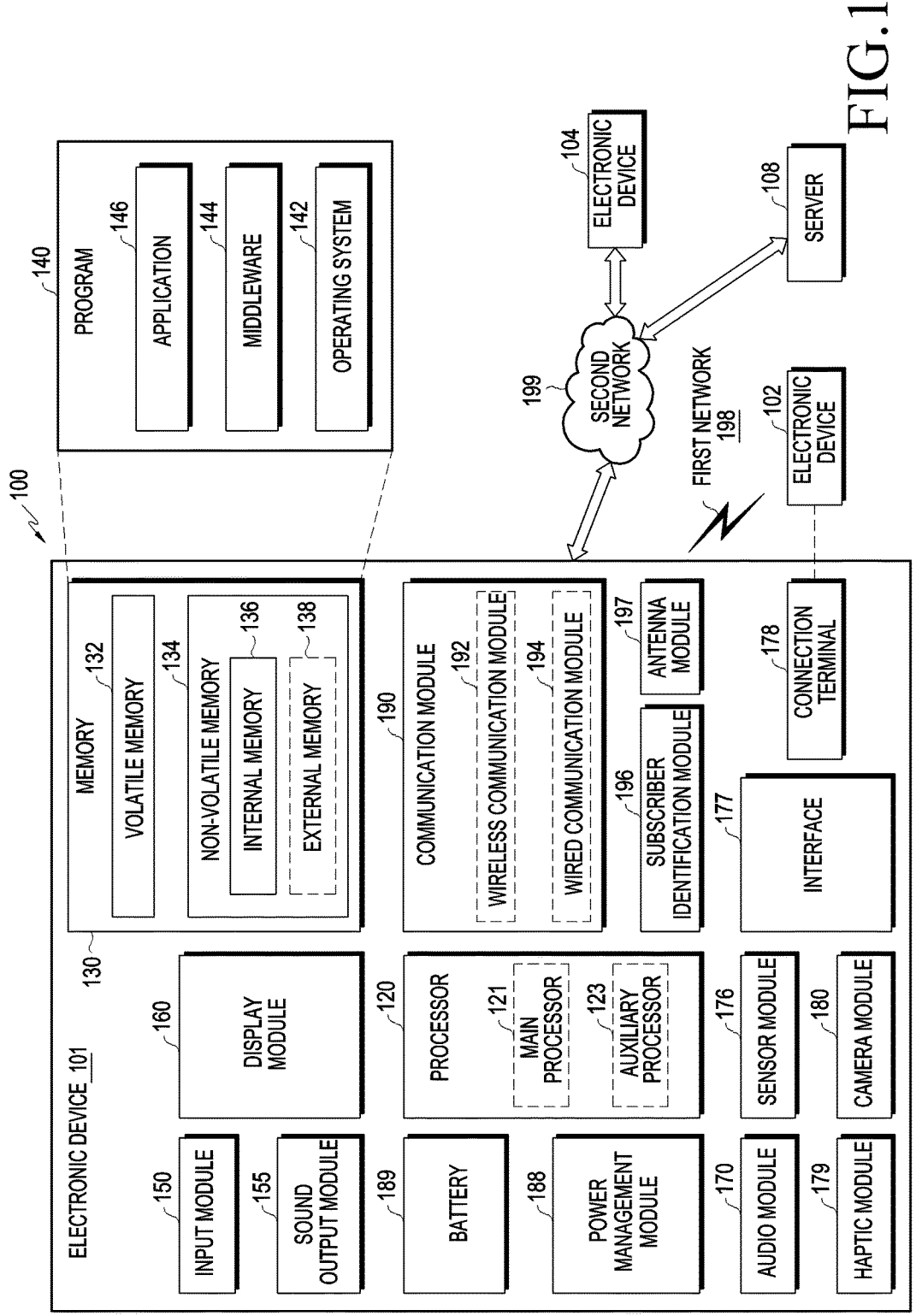
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
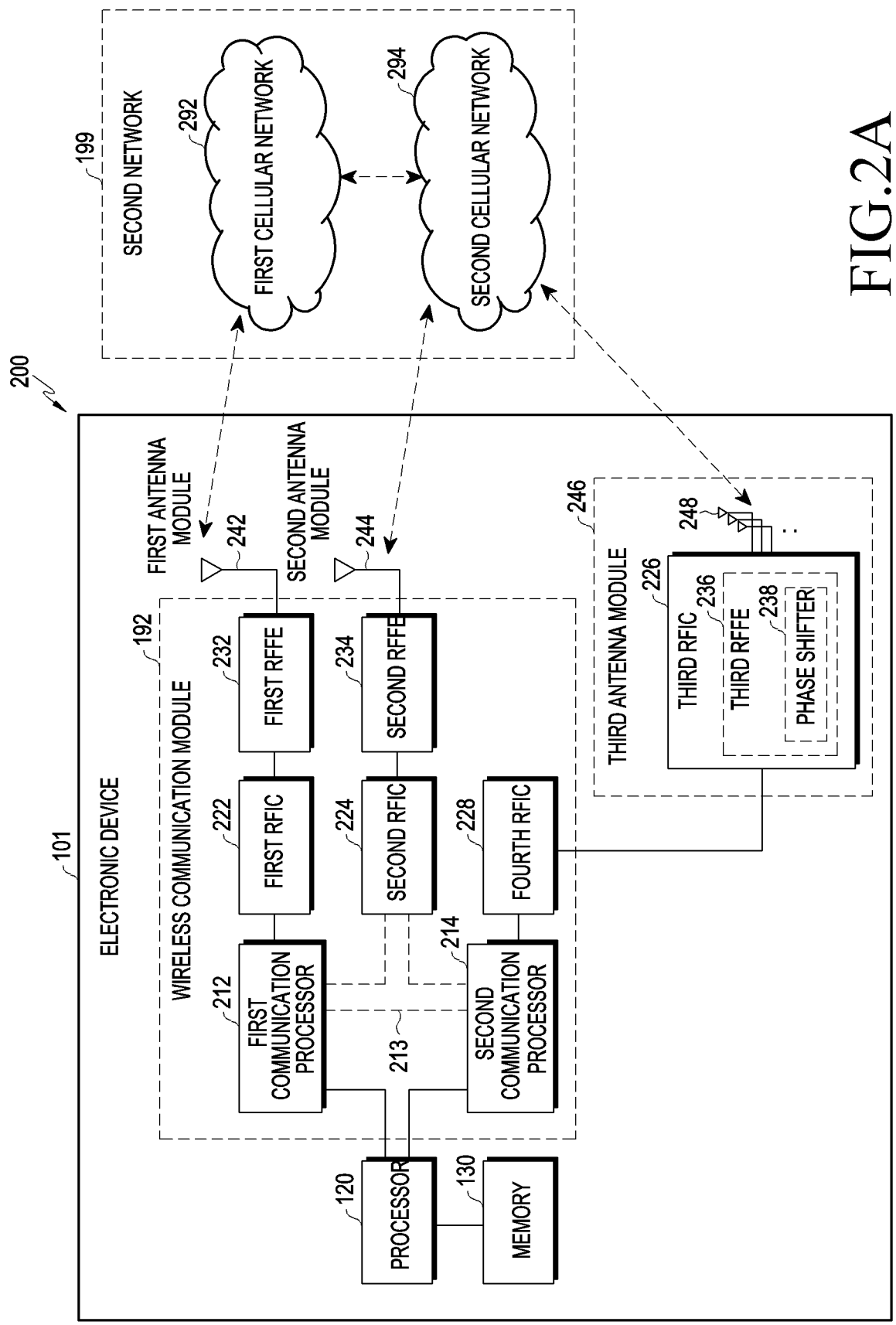
FIG. 2A is a block diagram illustrating an example configuration of an electronic device for supporting legacy network communication and 5G network communication, according to various embodiments.

FIG. 2A is a block diagram 200 illustrating an example configuration of the electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and an antenna 248. The electronic device 101 may further include the processor 120 and the memory 130. The second network 199 may include a first cellular network 292 and a second cellular network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may include various processing circuitry and establish a communication channel of a band to be used for wireless communication with the first cellular network 292, and may support legacy network communication via the established communication channel. According to various embodiments, the first cellular network may be a legacy network including a 2G, 3G, 4G, or long term evolution (LTE) network. The second communication processor 214 may include various processing circuitry and establish a communication channel corresponding to a designated band (e.g., approximately 6 GHz to 60 GHz) among bands to be used for wireless communication with the second cellular network 294, and may support 5G network communication via the established channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., lower than or equal to 6 GHz) among bands to be used for wireless communication with the second cellular network 294, and may support 5G network communication via the established communication channel.

The first communication processor 212 may perform data transmission or reception with the second communication processor 214. For example, data, which has been classified to be transmitted via the second cellular network 294, may be changed to be transmitted via the first cellular network 292. In this instance, the first communication processor 212 may receive transmission data from the second communication processor 214. For example, the first communication processor 212 may perform data transmission or reception with the second communication processor 214 via an inter-processor interface 213. The inter-processor interface 213 may be implemented as, for example, a universal asynchronous receiver/transmitter (UART) (e.g., a high speed-UART (HS-UART)) or a peripheral component interconnect bus express (PCIe), but the type of interface is not limited. Alternatively, the first communication processor 212 and the second communication processor 214 may exchange control information and packet data information using, for example, a shared memory. The first communication processor 212 may perform transmission or reception of various types of information such as sensing information, information associated with an output strength, and resource block (RB) allocation information, with the second communication processor 214.

Depending on the implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception with the processor 120 (e.g., an application processor) via a HS-UART interface or a PCIe interface, but the type of interface is not limited. Alternatively, the first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package.

Figure 2B:
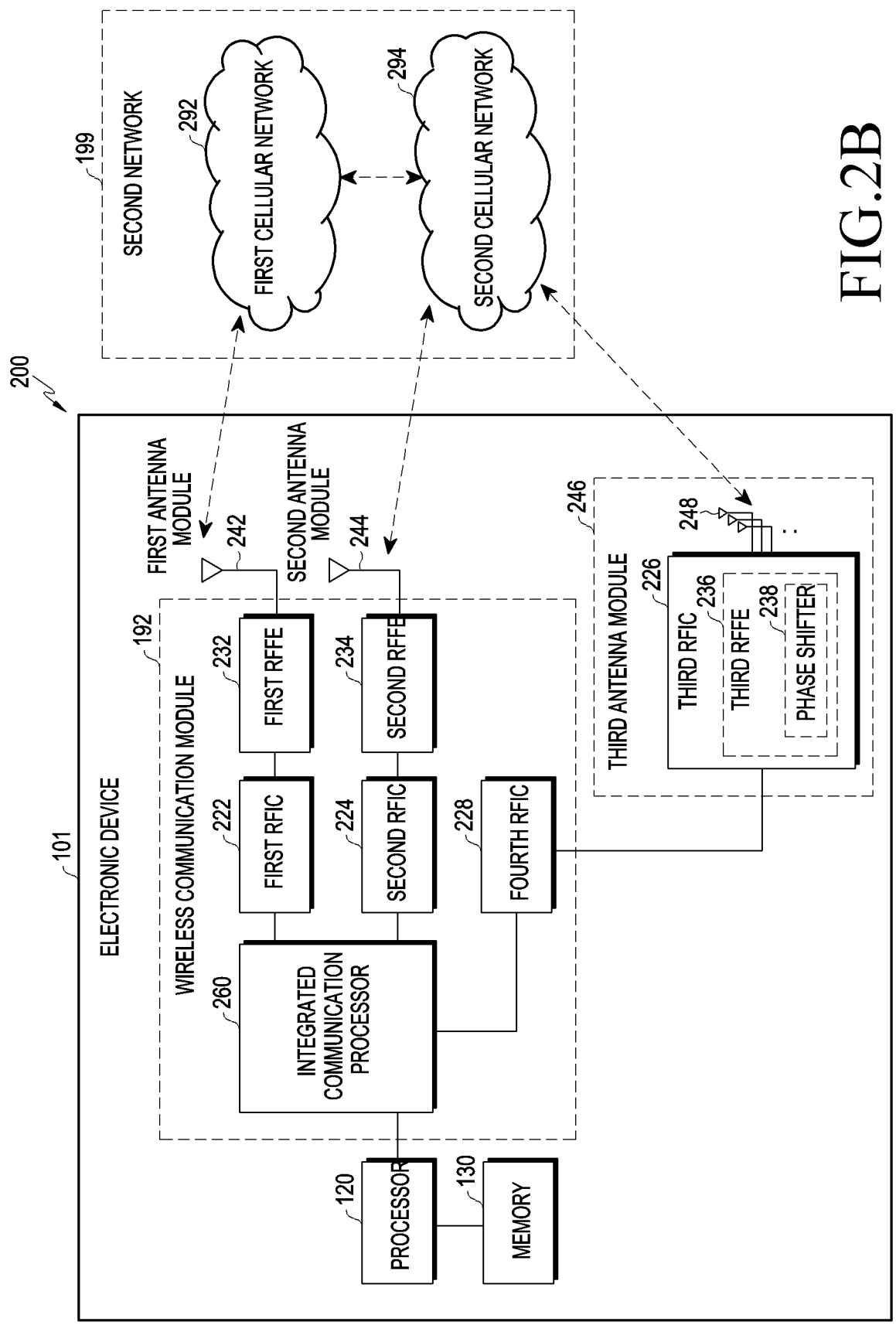
FIG. 2B is a block diagram illustrating an example configuration of an electronic device for supporting legacy network communication and 5G network communication, according to various embodiments.

According to various embodiments, the first communication processor 212 or the second communication processor 214 may be implemented in a single chip or a single package, together with the processor 120, the sub-processor 123, or the communication module 190. For example, as illustrated in FIG. 2B, an integrated communication processor 260 may support all functions for communication with a first cellular network 292 and a second cellular network 294.

In the case of transmission, the first RFIC 222 may convert a baseband signal produced by the first communication processor 212 into a radio frequency (RF) signal in the range of approximately 700 MHz to 3 GHz, which is used for the first cellular network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the signal is processed by the first communication processor 212.

In the case of transmission, the second RFIC 224 may convert a baseband signal produced by the first communication processor 212 or the second communication processor 214 into an RF signal (hereinafter, a 5G Sub6 RF signal) in an Sub6 band (e.g., approximately 6 GHz or less) used for the second cellular network 294 (e.g., a 5G network). In the case of reception, a 5G Sub6 RF signal is obtained from the second cellular network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal produced by the second communication processor 214 into an RF signal (hereinafter, a 5G Above6 RF signal) of a 5G Above6 band (e.g., approximately 6 GHz to 60 GHz) to be used for the second cellular network 294 (e.g., a 5G network). In the case of reception, a 5G Above6 RF signal is obtained from the second cellular network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

The electronic device 101, according to an embodiment, may include the fourth RFIC 228, separately from the third RFIC 226 or as a part of the third RFIC 226. In this instance, the fourth RFIC 228 may convert the baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second cellular network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 may process the signal.

According to an embodiment, the first RFIC 222 and the second RFIC 224 may be implemented as at least a part of a single chip or a single package. According to various embodiments, if the first RFIC 222 and the second RFIC 224 are embodied as a single chip or a single package in FIG. 2A or FIG. 2B, they may be implemented as an integrated RFIC. In this instance, the integrated RFIC is connected to the first RFFE 232 and the second RFFE 234, the integrated RFIC may convert a baseband signal into a signal in a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module, so as to process RF signals in a plurality of bands.

According to an embodiment, the third RFIC 226 and the antenna 248 may be disposed on the same substrate, and may form the third antenna module 246. For example, the radio communication module 192 or the processor 120 may be disposed in a first substrate (e.g., main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 is formed. By disposing the third RFIC 226 and the antenna 248 in the same substrate, the length of a transmission line therebetween may be reduced For example, this may reduce a loss (e.g., attenuation) of a high-frequency band signal (e.g., approximate 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be embodied as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6 RF signal to be transmitted to the outside of the electronic device 101 (e.g., a base station of the 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second cellular network 294 (e.g., a 5G network) may operate independently (e.g., standalone (SA)) from the first cellular network 292 (e.g., a legacy network), or may operate by being connected thereto (e.g., non-standalone (NSA)). For example, in the 5G network, only an access network (e.g., 5G radio access network (RAN) or next generation RAN (NG RAN)) may be present, and a core network (e.g., next generation core (NGC)) may not be present. In this instance, the electronic device 101 may access the access network of the 5G network, and may access an external network (e.g., the Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3A:
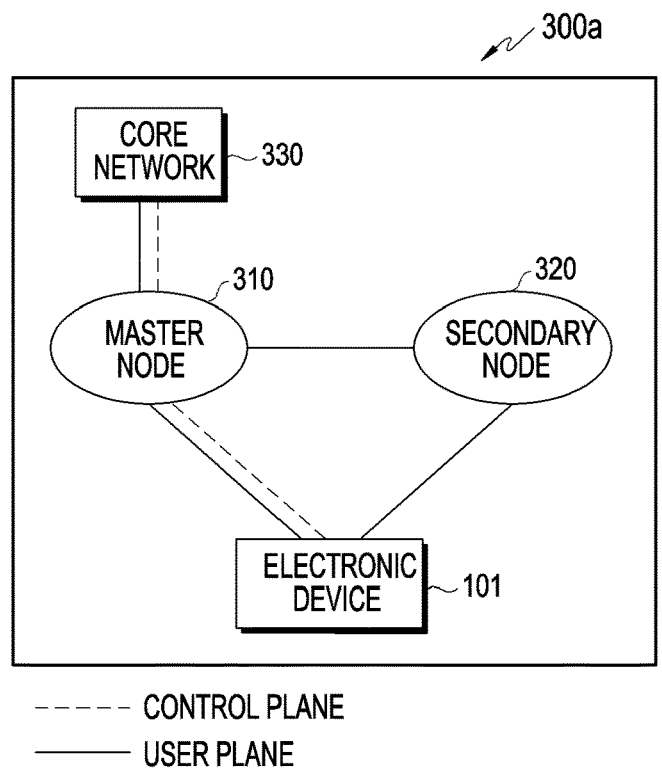
FIG. 3A is a diagram illustrating wireless communication systems that provide a legacy communication network and/or a 5G communication network according to various embodiments.
Figure 3B:
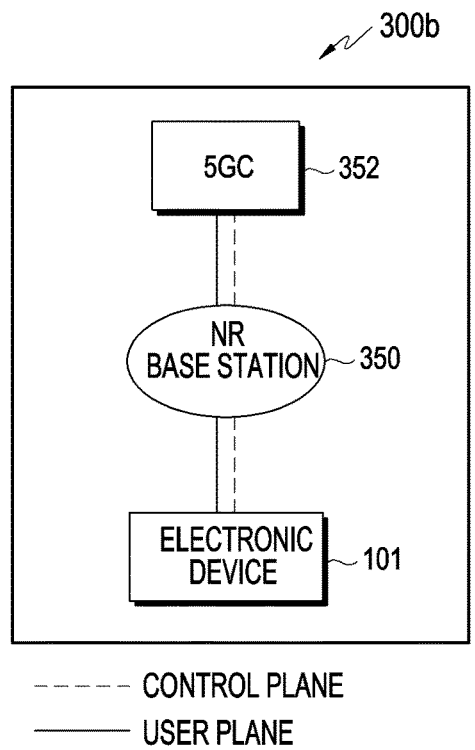
FIG. 3B is a diagram illustrating wireless communication systems that provide a legacy communication network and/or a 5G communication network according to various embodiments.
Figure 3C:
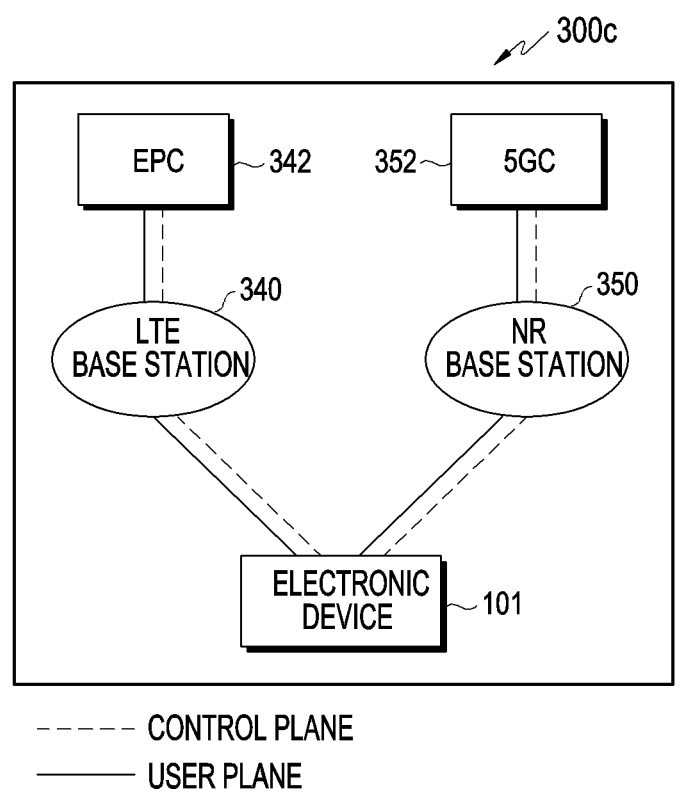
FIG. 3C is a diagram illustrating wireless communication systems that provide a legacy communication network and/or a 5G communication network according to various embodiments.

FIGS. 3A, 3B, and 3C are diagrams illustrating example wireless communication systems that provide a legacy communication network and/or a 5G communication network according to various embodiments. Referring to FIGS. 3A, 3B, and 3C, a network environment 300a, 300b and 300c may include at least one of a legacy network and a 5G network. The legacy network, for example, may include a 3GPP standard-based 4G or LTE base station 340 (e.g., eNodeB (eNB)) that supports radio access to the electronic device 101, and an evolved packet core (EPC) 342 that manages 4G communication. The 5G network, for example, may include a new radio (NR) base station 350 (e.g., a gNodeB (gNB)) that supports radio access to the electronic device 101 and a $5^{th}$ generation core (5GC) 352 that manages 5G communication of the electronic device 101.

According to various embodiments, the electronic device 101 may transmit or receive a control message and user data via legacy communication and/or 5G communication. The control message, for example, may include a message related to at least one of security control, bearer setup, authentication, registration, or mobility management in association with the electronic device 101 The user data, for example, may be user data, excluding a control message transmitted or received between the electronic device 101 and the core network 330 (e.g., the EPC 342).

Referring to FIG. 3A, the electronic device 101 according to an embodiment may perform transmission or reception of at least one of a control message or user data with at least a part of the 5G network (e.g., an NR base station 350 or a 5GC 352), using at least a part of the legacy network (e.g., an LTE base station 340 or an EPC 342).

According to various embodiments, the network environment 300a may include a network environment that provides a wireless communication dual connectivity (DC) to the LTE base station 340 and the NR base station 350, and performs transmission or reception of a control message with the electronic device 101 via the core network 230 corresponding to one of the EPC 342 or 5GC 352.

According to various embodiments, in a DC environment, one of the LTE base station 340 or the NR base station 350 may operate as a master node (MN) 310, and the other may operate as a secondary node (SN) 320. The MN 310 may be connected to the core network 230, and may transmit or receive a control message. The MN 310 and the SN 320 are connected via a network interface, and may perform transmission or reception of a message related to radio resource management (e.g., a communication channel).

According to various embodiments, the MN 310 may be embodied as the LTE base station 340, the SN 320 may be embodied as the NR base station 350, and the core network 330 may be embodied as the EPC 342. For example, a control message may be transmitted or received via the LTE base station 340 and the EPC 342, and user data may be transmitted or received via at least one of the LTE base station 340 or NR base station 350.

According to various embodiments, the MN 310 may be embodied as the NR base station 350, the SN 320 may be embodied as the LTE base station 340, and the core network 330 may be embodied as 5GC 352. For example, a control message may be transmitted or received via the NR base station 350 and the 5GC 352, and user data may be transmitted or received via at least one of the LTE base station 340 or NR base station 350.

Referring to FIG. 3B, according to various embodiments, the 5G network may be configured with the NR base station 350 and the 5GC 352, and may independently perform transmission or reception of a control message and user data with the electronic device 101.

Referring to FIG. 3C, the legacy network and the 5G network according to various embodiments may independently provide data transmission or reception. For example, the electronic device 101 and the EPC 342 may perform transmission or reception of a control message and user data via the LTE base station 340. As another example, the electronic device 101 and the 5GC 352 may perform transmission or reception of a control message and user data via the NR base station 350.

According to various embodiments, the electronic device 101 may be registered (registration) with at least one of the EPC 342 or 5GC 352, and may transmit or receive a control message.

According to various embodiments, the EPC 342 or 5GC 352 may interwork, so as to manage communication of the electronic device 101. For example, the movement information of the electronic device 101 may be transmitted or received via an interface between the EPC 342 and the 5GC 352.

As described above, dual connectivity via the LTE base station 340 and the NR base station 350 may be referred to as an E-UTRA new radio dual connectivity (EN-DC).

Hereinafter, a method of controlling transmission power according to various embodiments will be described with reference to FIGS. 4 to 10. Following methods will be performed via the electronic device 101 of FIGS. 1, 2A, 2B, 3A, 3B and 3C.

Figure 4:
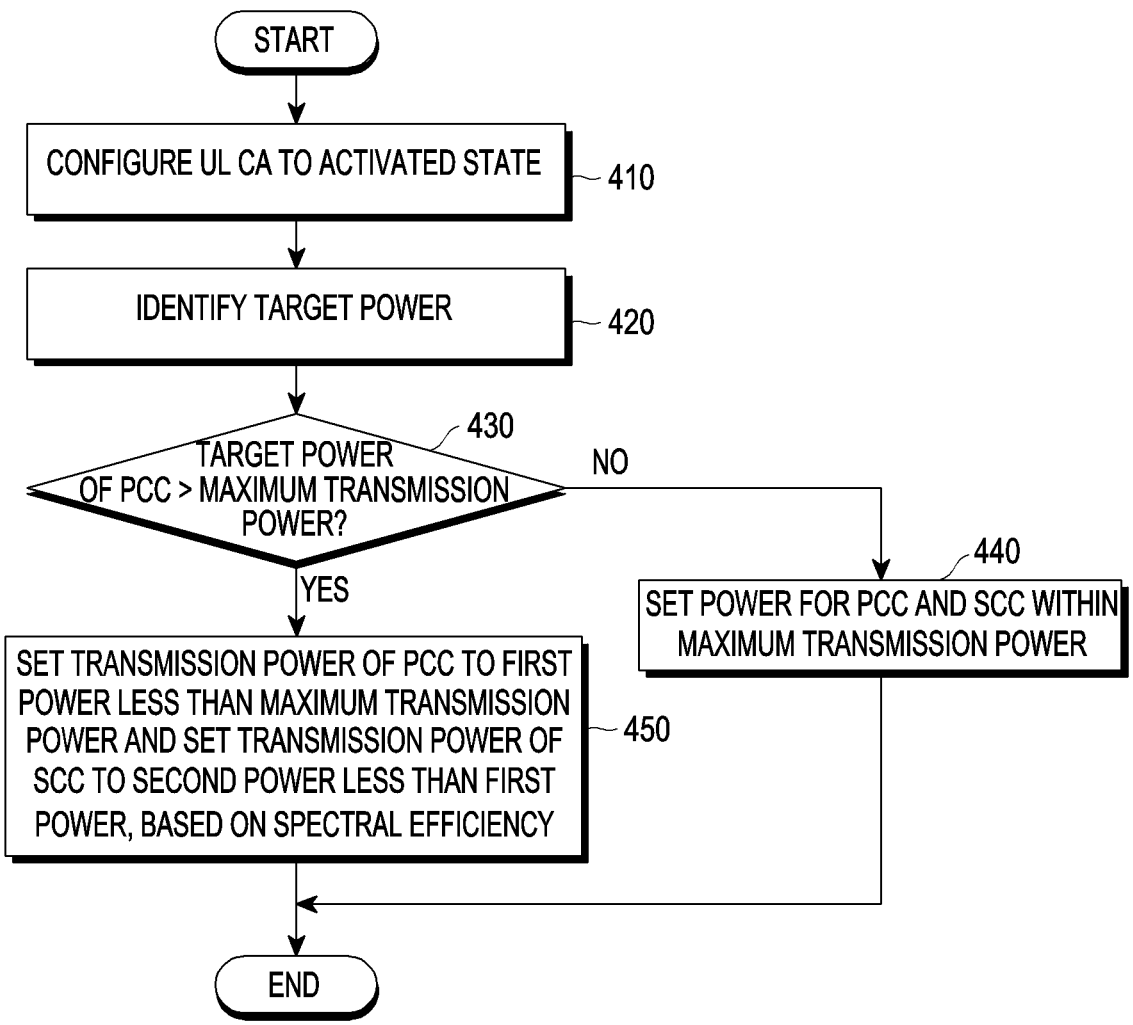
FIG. 4 is a flowchart illustrating an example method of operating an electronic device that controls transmission power according to various embodiments.

FIG. 4 is a flowchart illustrating an example method of operating an electronic device that controls transmission power according to various embodiments. Referring to FIG. 4, according to various embodiments, the electronic device 101 (e.g., the first communication processor 212 of FIG. 2A, the second communication processor 214, or the integrated communication processor 260 of FIG. 2B) may set (e.g., configure) uplink (UL) CA to an activated state in operation 410 if the electronic device supports uplink carrier aggregation (CA). According to various embodiments, the uplink CA may be configured by a signal (e.g., a UE capa. message, an RRC connection reconfiguration message, a medium access control (MAC) control element (CE)) transmitted or received between the electronic device and a base station. The electronic device may configure the uplink CA and may transmit data via a plurality of component carriers (CC), and thus, may provide a high data transmission rate. For example, the electronic device (e.g., the electronic device 101 of FIG. 1) may be assigned with a single or a plurality of frequency bandwidths among all allocable bandwidths, and may transmit or receive data. The electronic device 101 may transmit data by aggregating a plurality of frequency bandwidths, thereby providing a high data transmission rate. Each CC may be referred to as a cell, a single CC may be referred to as a primary CC (Pcell or SpCell) or a PCC, and other CCs may be referred to as secondary CCs (SCells) or SCCs. The base station may activate and operate a larger number of CCs for an electronic device that requires a higher data transmission rate, and may efficiently distribute load on a plurality of electronic devices in the coverage area of the base station. According to various embodiments, although the electronic device 101 performs control so as to transmit a signal corresponding to the PCC via a first antenna (e.g., the first antenna module 242 of FIG. 2A), and to transmit a signal corresponding to an SCC via a second antenna (e.g., the second antenna module 244 of FIG. 2A), the disclosure is not limited thereto. For example, the electronic device 101 may perform control so as to transmit a signal corresponding to the PCC and at least a part of a signal corresponding to an SCC together, via a single antenna (e.g., a first antenna). For example, control may be performed so that a signal corresponding to the PCC and a signal corresponding to a first SCC are transmitted via a first antenna, and a signal corresponding to a second SCC and a signal corresponding to a third SCC are transmitted via a second antenna. Hereinafter, a method of controlling power for two CCs (e.g., a single PCC and a single SCC) will be described as an example, according to various embodiments, and various embodiments may be applicable to three or more CCs.

According to various embodiments, an electronic device may control, based on target power required by the base station, the power of a transmission signal within the maximum transmission power which is capable of being transmitted by the electronic device. For example, the electronic device may control the power of the transmission signal to be the minimum value between the target power and the maximum transmission power (UE Tx MAX Power) of the electronic device. According to various embodiments, the maximum transmission power (UE Tx MAX Power) of the electronic device may be determined to be the minimum value among an available maximum transmission power (PcMax) of the electronic device in consideration of the characteristic of the electronic device, the maximum transmission power (PeMax) based on a power class set for the electronic device, and the maximum transmission power (SAR Max Power) in consideration of a specific absorption rate (SAR) backoff event. However, the scheme of determining the maximum transmission power is not limited.

According to various embodiments, the target power may be changed according to a channel state that varies in real time, and may be determined according to transmitting power control (TPC) performed by the base station. For example, the electronic device 101 may determine target power based on Equation 1 in the standard document 3GPP TS 38.213.

$$P_{O\_PUSCH,b,f,c}(j) + 10 \log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l) \text{[Equation 1]}$$

Equation 1 is defined in 3GPP TS 38.213. For example, $P_{O\_PUSCH,b,f,c(j)}$ may be provided by p0 for an activated uplink bandwidth part (UL BWP) (b) of a carrier (f) of a serving cell (c). $M^{PUSCH}_{RB,b,f,c}(i)$ is a bandwidth expressed by the number of resource blocks for transmission occasion (i) on an activated UL BWP(b) of a carrier (f) of a serving cell (c), and μ is a subcarrier spacing (SCS). $\alpha_{b,f,c(j)}$ may be provided by an alpha for an activated UL BWP of a carrier (f) of a serving cell (c). $PL_{b,f,c}(q_d)$ is a downlink path loss that a user equipment (UE) estimates in dB units using an RS resource index ($q_d$), with respect to an activated downlink BWP (DL BWP) of a serving cell (c). $f_{b,f,c}(i)$ is defined in 3GPP TS 38.213, and may be a value adjusted by downlink control information (DCI) transmitted from the base station to the electronic device.

According to various embodiments, if UL CA is set to an activated state in operation 410, the target power of each CC may be determined based on Equation 1, and the actual transmission power of each CC may be determined within a range in which the determined target power does not exceed the maximum transmission power of the electronic device. For example, on the assumption that the electronic device operates uplink CA and two CCs are activated, if the maximum transmission power of the electronic device is set to 23 dBm and target power determined based on Equation 1 is 20 dBm, the transmission power of a PCC may be set to 20 dBm and the transmission power of an SCC may be set to 20 dBm. For example, the sum of the transmission power of the PCC and the transmission power of the SCC may be set not to exceed the maximum transmission power of the electronic device.

According to various embodiments, the electronic device 101 (e.g., the first communication processor 212 of FIG. 2A, the second communication processor 214, the integrated communication processor 260 of FIG. 2B) may identify target power (e.g., the target power of the PCC) in operation 420. According to various embodiments, the electronic device 101 may determine whether the identified target power of the PCC exceeds the maximum transmission power of the electronic device in operation 430.

If the result of the determination shows that the target power of the PCC does not exceed the maximum transmission power (No in operation 430), the electronic device 101 may set the transmission power of the PCC and the transmission power of the SCC within the maximum transmission power in operation 440.

If the result of the determination shows that the target power of the PCC exceeds the maximum transmission power in operation (Yes in operation 430), the electronic device 101 according to various embodiments may set the transmission power of the PCC to a first power less than the maximum transmission power and may set the transmission power of the SCC to a second power less than the first power, based on a spectral efficiency in operation 450. An example of operation 450 will be described in greater detail below.

According to the standard document 3GPP 38.213, if the total sum of power of uplink channels exceed the maximum transmission power of an electronic device, power may be assigned based on priority. According to the standard document, if the electronic device operates uplink CA, the PCC may be assigned with power preferentially over the SCC. For example, on the assumption that the maximum transmission power of the electronic device is 23 dBm, if target power is identified as 24 dBm, the target power of the PCC and the SCC may be limited to 23 dBm. According to the standard document, since the PCC is prioritized over the SCC, if 23 dBm, which is the maximum transmission power, is preferentially assigned to the PCC, transmission power may not be assigned to the SCC.

Figure 5:
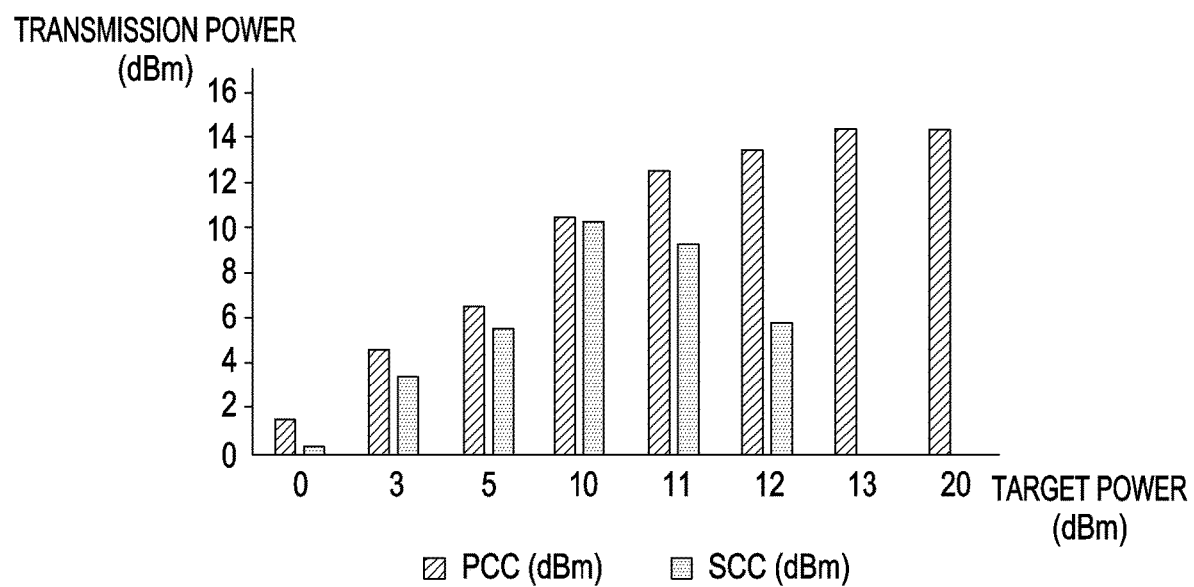
FIG. 5 is a graph illustrating a change in transmission power in association with target power according to various embodiments.

FIG. 5 is a graph illustrating a change in transmission power in association with target power according to various embodiments. Referring to FIG. 5, if a PCC has priority and target power is greater than or equal to 13 dBm, it is identified that the target power is limited to the maximum transmission power (e.g., 14.3 dBm) of the electronic device and power is not assigned to the SCC. The graph of FIG. 5 may be expressed as shown in Table 1 below.

TABLE 1

| Pcc Priority enable | | | |
|---|---|---|---|
| Target Power | PCC (dBm) | SCC (dBm) | PCC + SCC (dBm) |
| 0 | 1.4 | 0.4 | 4 |
| 3 | 4.6 | 3.4 | 7.1 |
| 5 | 6.6 | 5.6 | 9.1 |
| 10 | 10.5 | 10.3 | 13.4 |
| 11 | 12.5 | 9.2 | 14.2 |
| 12 | 13.5 | 5.8 | 14.2 |

TABLE 1-continued

| Pcc Priority enable | | | |
|---|---|---|---|
| Target Power | PCC (dBm) | SCC (dBm) | PCC + SCC (dBm) |
| 13 | 14.3 | −22.4 | 14.3 |
| 20 | 14.3 | −22.4 | 14.3 |

Referring to Table 1, it is identified that a transmission power of 10.5 dBm and a transmission power of 10.3 dBm are set for the PCC and the SCC, respectively, if target power is 10 dBm, and the sum of the transmission power of the PCC and the transmission power of the SCC is 13.4 dBm which is less than the maximum transmission power (e.g., 14.3 dBm). Conversely, if the target power exceeds 13 dBm, 14.3 dBm which is the maximum transmission power may be entirely set for the PCC and transmission power may be scarcely assigned to the SCC.

Although both the PCC and the SCC are capable of having efficiently high spectral efficiencies, the power may not be assigned to the SCC since priority is applied as shown in FIG. 5. Accordingly, the overall spectral efficiency of the electronic device may become relatively low.

According to various embodiments, the spectral efficiency may be calculated as shown in Table 2 below.

TABLE 2

| CQI | MCS | Spectral Efficiency | SNR in dB |
|---|---|---|---|
| 0 | out of range | — | — |
| 1 | QPSK, 78/1024 | 0.15237 | −9.478 |
| 2 | QPSK, 120/1024 | 0.2344 | −6.658 |
| 3 | QPSK, 193/1024 | 0.377 | −4.098 |
| 4 | QPSK, 308/1024 | 0.6016 | −1.798 |
| 5 | QPSK, 449/1024 | 0.877 | 0.399 |
| 6 | QPSK, 602/1024 | 1.1758 | 2.424 |
| 7 | 16QAM, 378/1024 | 1.4766 | 4.489 |
| 8 | 16QAM, 490/1024 | 1.9141 | 6.367 |
| 9 | 16QAM, 616/1024 | 2.4063 | 8.456 |
| 10 | 64QAM, 466/1024 | 2.7305 | 10.266 |
| 11 | 64QAM, 567/1024 | 3.3223 | 12.218 |
| 12 | 64QAM, 666/1024 | 3.9023 | 14.122 |
| 13 | 64QAM, 772/1024 | 4.5234 | 15.849 |
| 14 | 64QAM, 873/1024 | 5.1152 | 17.786 |
| 15 | 64QAM, 948/1024 | 5.5547 | 19.809 |

The base station may calculate a signal to noise ratio (SNR) for a signal received from each electronic device, and may allocate a modulation and coding scheme (MCS) to each electronic device based on the calculated SNR. The electronic device may modulate and code data according to the MCS allocated from the base station, and may transmit the same to the base station. Referring to Table 2, the spectral efficiency may be determined based on a modulation order (MO) and a code rate corresponding to a modulation scheme of the MCS. For example, channel quality indicator (CQI) 1 refers to a QPSK modulation scheme. An MO is 2 and a code rate is 78/1024 and thus, a spectral efficiency may be 0.1523 according to 2×(78/1024). In the same manner, CQI 8 refers to a 16 QAM modulation scheme. An MO is 4 and a code rate is 490/1024 and thus, a spectral efficiency may be 1.9141 according to 4×(490/1024). In the same manner, CQI 11 refers to a 64 QAM modulation scheme. An MO is 6 and a code rate is 567/1024 and thus, a spectral efficiency may be 3.3223 according to 6×(567/1024). According to various embodiments, the method of calculating a spectral efficiency is an example, and is not limited thereto.

According to various embodiments, if the maximum transmission power is set for the PCC and transmission power is not set for the SCC, the base station may identify an SNR for the PCC as 6.367, and may assign an MCS of which the CQI is 8 to the electronic device. According to the example of Table 2, if the CQI is 8, the spectral efficiency may be 1.9141. According to comparison, if configuration is performed so as to reduce transmission power for the PCC and to distribute the remaining power to the SCC (e.g., if the configuration is performed so as to distribute ½ of the maximum transmission power to each of the PCC and the SCC), the base station may identify an SNR for the PCC and the SCC is 2.424, and may assign an MCS of which the CQI is 6 to the electronic device. According to Table 2, if the CQI is 6, a spectral efficiency is 1.1758. Only the spectral efficiency of the PCC is decreased but the sum of the spectral efficiencies of the PCC and the SCC is 1.1758×2=2.3516. Accordingly, it is identified that the overall spectral efficiency of the electronic device is increased.

According to various embodiments, if the target power exceeds a set value (e.g., if the target power exceeds the maximum transmission power), the electronic device sets the power for the PCC and the SCC based on the spectral efficiency as described with reference to operation 450 so that the overall spectral efficiency is increased or maximized. The method of setting the power of the PCC and the SCC so that the overall spectral efficiency of the electronic device is increased or maximized may be variously implemented.

For example, the electronic device calculates an estimated MCS or an estimated spectral efficiency corresponding to transmission power, and may set the transmission power of the PCC and the transmission power of the SCC within the maximum transmission power of the electronic device so that the calculated spectral efficiency is maximized. According to various embodiments, the electronic device may calculate a spectral efficiency by setting the transmission power of the PCC to the maximum transmission power of the electronic device, and may identify an increase or decrease in the spectral efficiency by gradually decreasing the transmission power of the PCC by a set value, so as to maximize the spectral efficiency. An example related thereto will be described in greater detail below with reference to FIG. 6.

Figure 6:
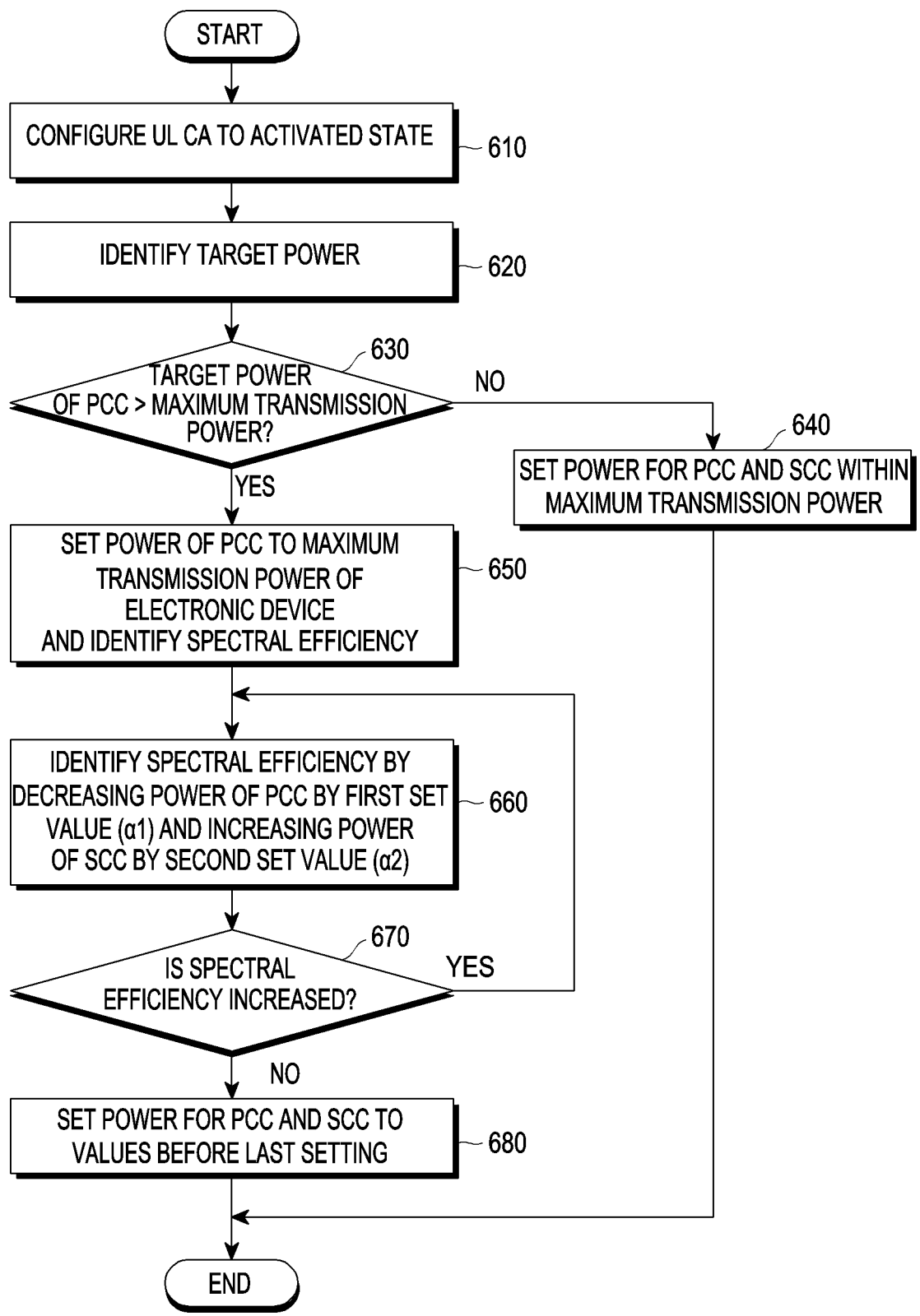
FIG. 6 is a flowchart illustrating an example method of operating an electronic device that controls transmission power according to various embodiments.

FIG. 6 is a flowchart illustrating an example method of operating an electronic device that controls transmission power according to various embodiments. Referring to FIG. 6, according to various embodiments, the electronic device 101 (e.g., the first communication processor 212 of FIG. 2A, the second communication processor 214, or the integrated communication processor 260 of FIG. 2B) may set (e.g., configure) uplink carrier aggregation (CA) to an activated state in operation 610 if the electronic device supports uplink CA. According to various embodiments, the uplink CA may be configured by a signal (e.g., a UE capa. message, an RRC connection reconfiguration message, a medium access control (MAC) control element (CE)) transmitted or received between the electronic device and a base station. The electronic device may configure the uplink CA and may transmit data via a plurality of component carriers (CC), and thus, may provide a high data transmission rate. The detailed description of the configuration of the uplink CA has been described with reference to FIG. 4, and thus, detailed description thereof may not be repeated here.

According to various embodiments, an electronic device may control, based on target power required by the base station, the power of a transmission signal within the maximum transmission power which is capable of being transmitted by the electronic device. For example, the electronic device may determine the minimum value between the target power and the maximum transmission power (UE Tx MAX Power) of the electronic device. According to various embodiments, the target power may be changed according to a channel state that varies in real time, and may be determined according to transmitting power control (TPC) performed by the base station. The detailed description of target power and the maximum transmission power of the electronic device has been described with reference to FIG. 4, and detailed description thereof may not be repeated here.

According to various embodiments, the electronic device 101 (e.g., the first communication processor 212 of FIG. 2A, the second communication processor 214, the integrated communication processor 260 of FIG. 2B) may identify target power (e.g., the target power of a PCC) in operation 620. According to various embodiments, the electronic device 101 may determine whether the identified target power of the PCC exceeds the maximum transmission power of the electronic device in operation 630.

If the result of the determination shows that the target power of the PCC does not exceed the maximum transmission power (No in operation 630), the electronic device 101 may set the transmission power of the PCC and the transmission power of the SCC within the maximum transmission power in operation 640.

If the result of the determination shows that the target power of the PCC exceeds the maximum transmission power (Yes in operation 630), the electronic device 101 according to various embodiments may set the power of the PCC to the maximum transmission power of the electronic device, and may identify a spectral efficiency in operation 650. For example, the electronic device 101 may set the transmission power of the PCC to the maximum transmission power and may transmit data, and may not assign transmission power to the SCC and may not transmit data. The electronic device 101 may be assigned with an MCS from the base station, and may identify a spectral efficiency based on the allocated MCS as shown in Table 3 below.

TABLE 3

| MCS Index | Modulation Order | Spectral efficiency | Target code Rate x [1024] |
|---|---|---|---|
| 0 | 2 | 0.2344 | 120 |
| 1 | 2 | 0.377 | 193 |
| 2 | 2 | 0.6016 | 308 |
| 3 | 2 | 0.877 | 449 |
| 4 | 2 | 1.1758 | 602 |
| 5 | 4 | 1.4766 | 378 |
| 6 | 4 | 1.6953 | 434 |
| 7 | 4 | 1.9141 | 490 |
| 8 | 4 | 2.1602 | 553 |
| 9 | 4 | 2.4063 | 616 |
| 10 | 4 | 2.5703 | 658 |
| 11 | 6 | 2.7305 | 466 |
| 12 | 6 | 3.0293 | 517 |
| 13 | 6 | 3.3223 | 567 |
| 14 | 6 | 3.6094 | 616 |
| 15 | 6 | 3.9023 | 666 |
| 16 | 6 | 4.2129 | 719 |
| 17 | 6 | 4.5234 | 772 |
| 18 | 6 | 4.8164 | 822 |
| 19 | 6 | 5.1152 | 873 |
| 20 | 8 | 5.332 | 682.5 |
| 21 | 8 | 5.5547 | 711 |
| 22 | 8 | 5.8906 | 754 |
| 23 | 8 | 6.2266 | 797 |
| 24 | 8 | 6.5703 | 841 |
| 25 | 8 | 6.9141 | 885 |
| 26 | 8 | 7.1602 | 916.5 |
| 27 | 8 | 7.4063 | 948 |

TABLE 3-continued

| MCS Index | Modulation Order | Spectral efficiency | Target code Rate x [1024] |
|---|---|---|---|
| 28 | 2 | | reserved |
| 29 | 4 | | reserved |
| 30 | 6 | | reserved |

For example, the electronic device 101 may identify a corresponding spectral efficiency based on an MCS index assigned from the base station.

According to various embodiments, the electronic device 101 (e.g., the first communication processor 212 of FIG. 2A, the second communication processor 214, the integrated communication processor 260 of FIG. 2B) may identify a spectral efficiency by decreasing the power of the PCC by a first set value ($\alpha_1$) from the maximum transmission power and by increasing the power of the SCC by a second set value ($\alpha_2$) in operation 660. According to various embodiments, the first set value and the second set value may be set to be the same value, similar values, or different values. Hereinafter, it is assumed that the first set value and the second set value are set to the same set value ($\alpha$), but the disclosure is not limited thereto. For example, the electronic device 101 may transmit data by decreasing the transmission power of the PCC by a set value (e.g., 1 dBm) from the maximum transmission power, and may transmit data by increasing the transmission power of the SCC by residual transmission power obtained via the reduction of the transmission power of the PCC. The electronic device 101 may be assigned with an MCS associated with the PCC and the SCC from the base station, and may identify a spectral efficiency based on the assigned MCS as shown in Table 3 below.

According to various embodiments, if the result of the identification shows that the spectral efficiency is increased than a previously identified value (Yes in operation 670), it is determined that decreasing the transmission power of the PCC is effective increasing the spectral efficiency, and operation 660 is repeatedly performed. For example, operation 660 may be repeatedly performed until decreasing the transmission power of the PCC is no longer effective in increasing the spectral efficiency. For example, if an increase in the spectral efficiency in association with an increase in the transmission power of the SCC is higher than a decrease in the spectral efficiency in association with a decrease in the transmission power of the PCC, it is determined as being effective in increasing the spectral efficiency and the procedure may be repeatedly performed.

According to various embodiments, if the result of the identification in operation 670 shows that the spectral efficiency is decreased than a previously identified value (No in operation 670), it is determined that decreasing the transmission power of the PCC is no longer effective in increasing the spectral efficiency, the power of the PCC and the SCC are set to values before the last setting (e.g., set values before the power of the PCC is lastly decreased by a set value) in operation 680.

According to various embodiments, the set value ($\alpha$) may be set within a range of Equation 2.

$$\frac{\text{maximum } TX \text{ power}}{2} < \alpha < \text{maximum } TX \text{ power} \quad [\text{Equation 2}]$$

Since the set value is limited to the range of Equation 2, the transmission power of the SCC may be set not to exceed the transmission power of the PCC.

According to various embodiments, although figures applied to the operations in FIG. 6 are shown as below, the disclosure is not limited thereto.

If the maximum transmission power of the electronic device is 10 dBm and target power is 12 dBm, the transmission power of the PCC may be set to 10 dBm which is the maximum transmission power. According to the setting, the PCC may be assigned with MCS index 27 of Table 3. In this instance, the spectral efficiency of the PCC may be identified as 7.4063, and the SCC is not assigned with transmission power and a spectral efficiency may be 0.

According to various embodiments, if a set value is set to 1 dBm, the electronic device may perform setting so as to decrease the transmission power of the PCC by 1 dBm from 10 dBm which is the maximum transmission power. Accordingly, the transmission power of the PCC may be 10 dBm−1 dBm=9.42 dBm, and the PCC may be assigned with MCS index 26 of Table 3 according to the set transmission power. The electronic device may set the transmission power of the PCC to be decreased by 1 dBm, and thus, may set the transmission power of the SCC to be increased by 1 dBm. Accordingly, the transmission power of the SCC may be 1 dBm, and the SCC may be assigned with MCS index 1 of Table 3 according to the set transmission power. Referring to Table 3, the electronic device may identify a total spectral efficiency of 7.5372 by adding a spectral efficiency of 7.1602 corresponding to the MCS index 26 of the PCC and a spectral efficiency of 0.377 corresponding to the MCS index 1 of the SCC.

According to various embodiments, the total spectral efficiency of the electronic device is increased from 7.4063 to 7.5372 according to the transmission power control, and thus, the transmission power of the PCC may be set to be further decreased by a set value. Accordingly, the transmission power of the PCC may be 9.42 dBm−1 dBm=8.75 dBm, and the PCC may be assigned with MCS index 23 of Table 3 according to the set transmission power. The electronic device may set the transmission power of the PCC to be decreased by 1 dBm, and thus, may set the transmission power of the SCC to be increased by 1 dBm. Accordingly, the transmission power of the SCC may be 1 dBm+1 dBm=4.01 dBm, and the SCC may be assigned with MCS index 5 of Table 3 according to the set transmission power. Referring to Table 3, the electronic device may identify a total spectral efficiency of 7.7032 by adding a spectral efficiency of 6.2266 corresponding to the MCS index 23 of the PCC and a spectral efficiency of 1.4766 corresponding to the MCS index 5 of the SCC.

According to various embodiments, the total spectral efficiency of the electronic device is increased from 7.5372 to 7.7032 according to the transmission power control, and thus, the transmission power of the PCC may be set to be further decreased by a set value. Accordingly, the transmission power of the PCC may be 8.75 dBm−1 dBm=7.95 dBm, and the PCC may be assigned with MCS index 19 of Table 3 according to the set transmission power. The electronic device may set the transmission power of the PCC to be decreased by 1 dBm, and thus, may set the transmission power of the SCC to be increased by 1 dBm. Accordingly, the transmission power of the SCC may be 4.01 dBm+1 dBm=5.77 dBm, and the SCC may be assigned with MCS index 10 of Table 3 according to the set transmission power. Referring to Table 3, the electronic device may identify a total spectral efficiency of 7.6855 by adding a spectral efficiency of 5.1152 corresponding to the MCS index 19 of the PCC and a spectral efficiency of 2.5703 corresponding to the MCS index 10 of the SCC.

According to various embodiments, the total spectral efficiency of the electronic device is no longer increased, but is decreased again from 7.7032 to 7.6855 according to the transmission power control, and thus, a value before the last setting may be determined as a value corresponding to the maximum spectral efficiency. For example, the transmission power of the PCC may be set to 8.75 dBm, and the transmission power of the SCC may be set to 4.01 dBm.

Figure 7:
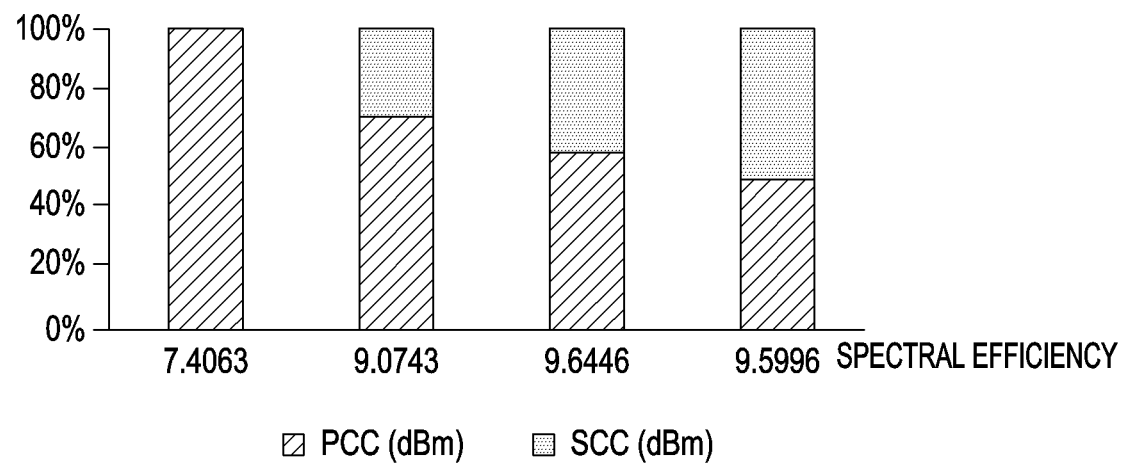
FIG. 7 is a graph illustrating spectral efficiencies of power set for a PCC and an SCC according to various embodiments.

FIG. 7 is a graph illustrating spectral efficiencies of power set for a PCC and an SCC according to various embodiments. Referring to FIG. 7, if target power exceeds the maximum transmission power of an electronic device, and the magnitude of transmission power is limited, the overall spectral efficiency may be increased by decreasing the transmission power of the PCC and increasing the transmission power of the SCC.

For example, FIG. 7 may be listed as shown in Table 4 below.

TABLE 4

| Target Power | PCC (dBm) | SCC (dBm) | PCC MCS | SCC MCS | Spectral efficiency |
|---|---|---|---|---|---|
| 13 | 14.3 | 0 | 27 | 0 | 7.4063 |
|  | 13.5 | 5.8 | 26 | 7 | 9.0743 |
|  | 12.5 | 9.2 | 25 | 11 | 9.6446 |
|  | 10.5 | 10.3 | 24 | 12 | 9.5996 |
|  | 12.5 | 9.2 | 25 | 11 | 9.6446 |

Referring to FIG. 7 and Table 4, if target power is 13 dBm, 14.3 dBm corresponding to the maximum transmission power may be set for the PCC, and transmission power may not be set for the SCC. In this instance, according to Table 3, the overall spectral efficiency may be 7.4063.

According to various embodiments, it is identified that the overall spectral efficiency increased by gradually decreasing the transmission power of the PCC and gradually increasing the transmission power of the SCC. For example, as listed in Table 4, if the transmission power of the PCC is set to 12.5 dBm and the transmission power of the SCC is set to 9.2 dBm, the overall spectral efficiency is maximized to 9.6446.

Figure 8:
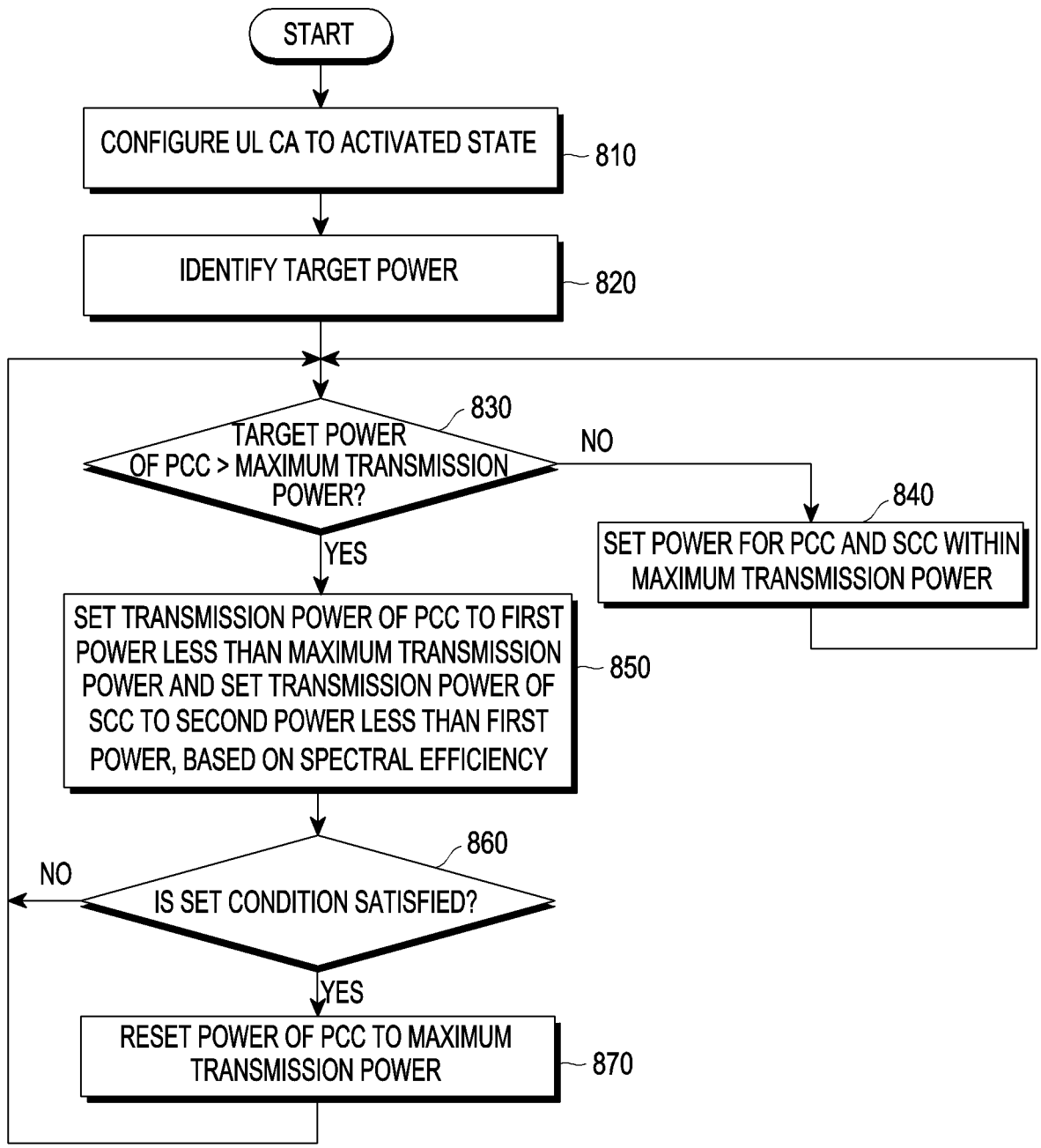
FIG. 8 is a flowchart illustrating an example method of operating an electronic device that controls transmission power according to various embodiments.

FIG. 8 is a flowchart illustrating an example method of operating an electronic device that controls transmission power according to various embodiments. Referring to FIG. 8, according to various embodiments, the electronic device 101 (e.g., the first communication processor 212 of FIG. 2A, the second communication processor 214, or the integrated communication processor 260 of FIG. 2B) may set (e.g., configure) uplink carrier aggregation (CA) to an activated state in operation 810 if the electronic device supports uplink CA. According to various embodiments, the uplink CA may be configured by a signal (e.g., a UE capa. message, an RRC connection reconfiguration message, a medium access control (MAC) control element (CE)) transmitted or received between the electronic device and a base station. The electronic device may configure the uplink CA and may transmit data via a plurality of component carriers (CC), and thus, may provide a high data transmission rate. The detailed description of the configuration of the uplink CA has been described with reference to FIG. 4, and thus, detailed description thereof may not be repeated here.

According to various embodiments, an electronic device may control, based on target power required by a base station, the power of a transmission signal within the maximum transmission power which is capable of being transmitted by the electronic device. For example, the electronic device may determine the minimum value between the target power and the maximum transmission power (UE Tx MAX Power) of the electronic device. According to various embodiments, the target power may be changed according to a channel state that varies in real time, and may be determined according to transmitting power control (TPC) performed by the base station. The detailed description of target power and the maximum transmission power of the electronic device has been described with reference to FIG. 4, and detailed description thereof may not be repeated here.

According to various embodiments, the electronic device 101 (e.g., the first communication processor 212 of FIG. 2A, the second communication processor 214, the integrated communication processor 260 of FIG. 2B) may identify target power (e.g., the target power of a PCC) in operation 820. According to various embodiments, the electronic device 101 may determine whether the identified target power of the PCC exceeds the maximum transmission power of the electronic device in operation 830.

If the result of the determination shows that the target power of the PCC does not exceed the maximum transmission power (No in operation 830), the electronic device 101 may set the transmission power of the PCC and the transmission power of the SCC within the maximum transmission power in operation 840.

If the result of the determination shows that the target power of the PCC exceeds the maximum transmission power in operation (Yes in operation 830), the electronic device 101 according to various embodiments may set the transmission power of the PCC to a first power less than the maximum transmission power and may set the transmission power of the SCC to a second power less than the first power, based on a spectral efficiency in operation 850. Example of operation 850 has been described in detail with reference to FIG. 4, and detailed description thereof may not be repeated here.

According to various embodiments, the electronic device 101 (e.g., the first communication processor 212 of FIG. 2A, the second communication processor 214, the integrated communication processor 260 of FIG. 2B) may identify whether a set condition is satisfied in operation 860. The set condition may include a condition that an electronic device should receive a predetermined message (e.g., RRC reconfiguration message) from a base station or a condition that the state of an electronic device should be changed (e.g., change to an RRC idle state, change of a serving cell). According to various embodiments, the set condition may include a condition in which a path loss should have a difference of at least a set value (e.g., 10 dB) from a previous path loss. The path loss may be determined according to Equation 3.

$$NR\ pathloss = ss\text{-}PBCH\text{-}BlockPower - RSRP \pm \alpha \quad \text{[Equation 3]}$$

In Equation 3, ss-PBCH-BlockPower is a value that occupies most of the path loss, and may be included in an RRC reconfiguration message for transmission. For example, referring to Equation 3, if an RSRP varies by at least a predetermined value (e.g., 10 dB), it is identified that the set condition is satisfied.

According to various embodiments, if the set condition is satisfied in operation 860 (Yes in operation 860), the electronic device 101 (e.g., the first communication processor 212 of FIG. 2A, the second communication processor 214, the integrated communication processor 260 of FIG. 2B) may reset the power of the PCC to the maximum transmission power in operation 870. For example, if the set condition is satisfied, it is the case in which the state of the electronic device or the state of a wireless channel is relatively dramatically changed. Accordingly, the power of the PCC may be reset to the maximum transmission power and the previous operations (e.g., operations 830 to 860) may be performed again.

According to various embodiments, if the set condition is not satisfied in operation 860 (No in operation 860), the electronic device 101 (e.g., the first communication processor 212 of FIG. 2A, the second communication processor 214, the integrated communication processor 260 of FIG. 2B) may proceed with operation 830 and repeatedly perform the above-described operations.

Figure 9:
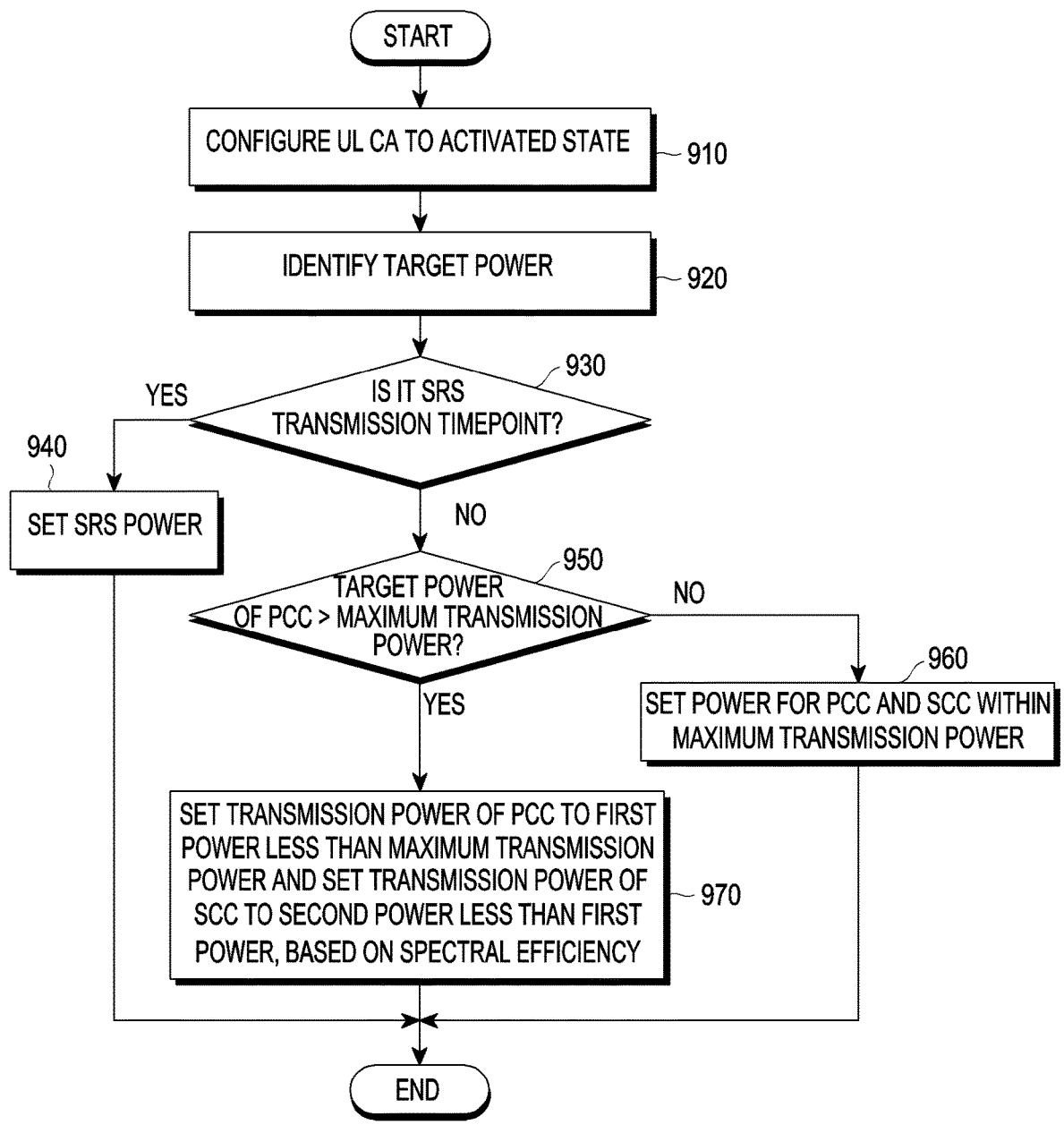
FIG. 9 is a flowchart illustrating an example method of operating an electronic device that controls transmission power according to various embodiments.

FIG. 9 is a flowchart illustrating an example method of operating an electronic device that controls transmission power according to various embodiments. Referring to FIG. 9, according to various embodiments, the electronic device 101 (e.g., the first communication processor 212 of FIG. 2A, the second communication processor 214, or the integrated communication processor 260 of FIG. 2B) may set (e.g., configure) uplink carrier aggregation (CA) to an activated state in operation 910 if the electronic device supports uplink CA. According to various embodiments, the uplink CA may be configured by a signal (e.g., a UE capa. message, an RRC connection reconfiguration message, a medium access control (MAC) control element (CE)) transmitted or received between the electronic device and a base station. The electronic device may configure the uplink CA and may transmit data via a plurality of component carriers (CC), and thus, may provide a high data transmission rate. The detailed description of the configuration of the uplink CA has been described with reference to FIG. 4, and thus, detailed description thereof may not be repeated here.

According to various embodiments, an electronic device may control, based on target power required by a base station, the power of a transmission signal within the maximum transmission power which is capable of being transmitted by the electronic device. For example, the electronic device may determine the minimum value between the target power and the maximum transmission power (UE Tx MAX Power) of the electronic device. According to various embodiments, the target power may be changed according to a channel state that varies in real time, and may be determined according to transmitting power control (TPC) performed by the base station. The detailed description of target power and the maximum transmission power of the electronic device has been described with reference to FIG. 4, and detailed description thereof may not be repeated here.

According to various embodiments, the electronic device 101 (e.g., the first communication processor 212 of FIG. 2A, the second communication processor 214, the integrated communication processor 260 of FIG. 2B) may identify target power (e.g., the target power of a PCC) in operation 920. According to various embodiments, the electronic device 101 (e.g., the first communication processor 212 of FIG. 2A, the second communication processor 214, the integrated communication processor 260 of FIG. 2B) may identify whether it is an SRS transmission timepoint in operation 930. If the result of the identification shows that it is the SRS transmission timepoint (Yes in operation 930), the electronic device 101 may set SRS power based on the identified target power in operation 940.

According to various embodiments, the SRS transmission timepoint may be identified by configuration information (e.g., resourceSet configuration information in an RRC reconfiguration message) transmitted from the base station. For example, if a periodic SRS is configured in the form of 1T4R, resourceType in SRS resourceSet may be set to "periodic" and usage may be set to "antennaSwitching". A detailed transmission resource configuration may be configured in resource mapping in SRS-ResourceId, for each time/frequency domain (time/freq domain). For example, an SRS transmission timepoint may be configured with startPosition 0 (the last symbol in a slot in which an SRS is transmitted), nrofSymbols n1 (the number of transmitted SRS resource symbols: 1), nrofSymbols n1 (the number of SRS symbols repeatedly transmitted: 1), and periodicityAndOffset-p (slot period for transmission: 5 slots, slot offset: 2 slots).

If the result of the identification shows that it is not an SRS transmission timepoint (No in operation 930), the electronic device 101 (e.g., the first communication processor 212 of FIG. 2A, the second communication processor 214, and the integrated communication processor 260 of FIG. 2B) may determine whether the identified target power of the PCC exceeds the maximum transmission power of the electronic device in operation 950.

If the result of the determination shows that the target power of the PCC does not exceed the maximum transmission power (No in operation 950), the electronic device 101 may set the transmission power of the PCC and the transmission power of the SCC within the maximum transmission power in operation 960.

If the result of the determination shows that the target power of the PCC exceeds the maximum transmission power (Yes in operation 950), the electronic device 101 according to various embodiments may set the transmission power of the PCC to a first power less than the maximum transmission power and may set the transmission power of the SCC to a second power less than the first power, based on a spectral efficiency in operation 970. Example of operation 970 has been described in detail with reference to FIG. 4, and detailed description thereof may not be repeated here.

Figure 10:
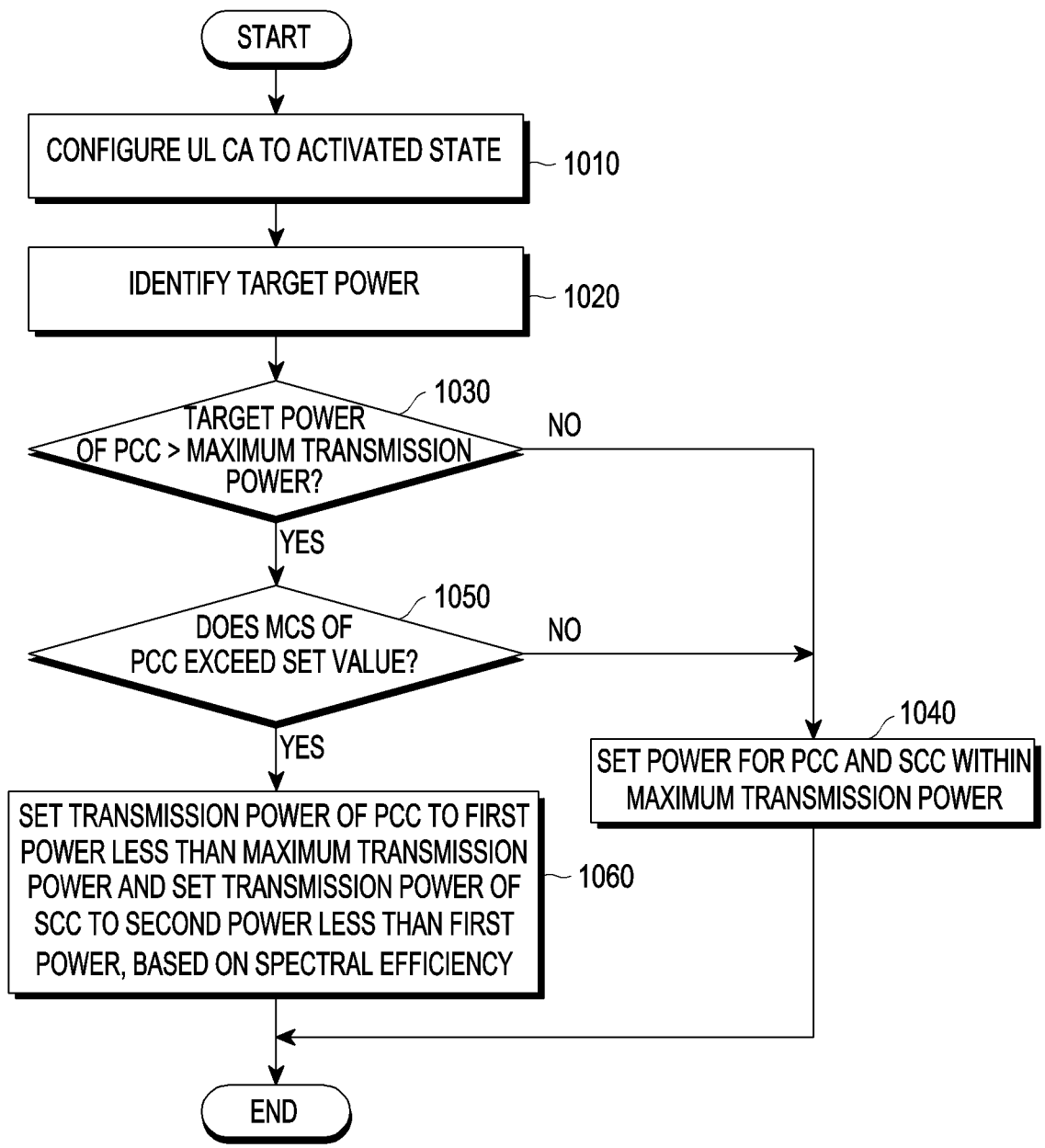
FIG. 10 is a flowchart illustrating an example method of operating an electronic device that controls transmission power according to various embodiments.

FIG. 10 is a flowchart illustrating an example method of operating an electronic device that controls transmission power according to various embodiments. Referring to FIG. 10, according to various embodiments, the electronic device 101 (e.g., the first communication processor 212 of FIG. 2A, the second communication processor 214, or the integrated communication processor 260 of FIG. 2B) may set (e.g., configure) uplink carrier aggregation (CA) to an activated state in operation 1010 if the electronic device supports uplink CA. According to various embodiments, the uplink CA may be configured by a signal (e.g., a UE capa. message, an RRC connection reconfiguration message, a medium access control (MAC) control element (CE)) transmitted or received between the electronic device and a base station. The electronic device may configure the uplink CA and may transmit data via a plurality of component carriers (CC), and thus, may provide a high data transmission rate. The detailed description of the configuration of the uplink CA has been described with reference to FIG. 4, and thus, detailed description thereof may not be repeated here.

According to various embodiments, an electronic device may control, based on target power required by a base station, the power of a transmission signal within the maximum transmission power which is capable of being transmitted by the electronic device. For example, the electronic device may determine the minimum value between the target power and the maximum transmission power (UE Tx MAX Power) of the electronic device. According to various embodiments, the target power may be changed according to a channel state that varies in real time, and may be determined according to transmitting power control (TPC) performed by the base station. The detailed description of target power and the maximum transmission power of the electronic device has been described with reference to FIG. 4, and detailed description thereof may not be repeated here.

According to various embodiments, the electronic device 101 (e.g., the first communication processor 212 of FIG. 2A, the second communication processor 214, the integrated communication processor 260 of FIG. 2B) may identify target power (e.g., the target power of a PCC) in operation 1020. According to various embodiments, the electronic device 101 may determine whether the identified target power of the PCC exceeds the maximum transmission power of the electronic device in operation 1030.

If the result of the determination shows that the target power of the PCC does not exceed the maximum transmission power (No in operation 1030), the electronic device 101 may set the transmission power of the PCC and the transmission power of the SCC within the maximum transmission power in operation 1040.

If the result of the determination shows that the target power of the PCC exceeds the maximum transmission power (Yes in operation 1030), the electronic device 101 according to various embodiments may identify whether the MCS of the PCC exceeds a set value in operation 1050. For example, if an MCS assigned to the electronic device is low, a small change in transmission power may make a large change in spectral efficiency. Accordingly, if an MCS is relatively low, a gain of the overall spectral efficiency may be secured by increasing the transmission power of the PCC in the same manner as the legacy operations. Conversely, if an MCS is relatively high, a change in transmission power does not make a dramatic difference in spectral efficiency and thus, an optimal spectral efficiency may be achieved by distributing the transmission power concentrated on the PCC to the SCC.

According to various embodiment, if the result of the determination shows that the MCS of the PCC exceeds a set value (Yes in operation 1050), the electronic device 101 according to various embodiments may set the transmission power of the PCC to a first power that is less than the maximum transmission power and may set the transmission power of the SCC to a second power that is less than the first power, based on a spectral efficiency in operation 1060. Example of operation 1060 has been described in detail with reference to FIG. 4, and detailed description thereof may not be repeated here.

According to various embodiments, if the MCS of the PCC does not exceed a set value (No in operation 1050), the electronic device 101 (e.g., the first communication processor 212 of FIG. 2A, the second communication processor 214, the integrated communication processor 260 of FIG. 2B) may set the transmission power of the PCC and the transmission power of the SCC within the maximum transmission power in operation 1040.

According to various embodiments, although the transmission power of the PCC and the transmission power of the SCC are set based on a spectral efficiency, the spectral efficiency may be replaced with another value. For example, the above-described spectral efficiency may be replaced with at least one of a code rate, a modulation order, and a transmission rate (e.g., throughput).

According to various embodiments, although the above-described embodiment describes 2CCs, the embodiment may be equivalently or similarly applicable to the case of 3CCs or more. For example, configuration is performed so that power obtained via reduction of the power for the PCC is to be distributed to one of the plurality of SCCs if two or more SCCs are used. According to an embodiment, configuration may be performed so that power obtained via reduction of the power for the PCC may be equally distributed to the plurality of SCCs if two or more SCCs are used.

An electronic device according to any one of various example embodiments may include: a communication processor, at least one radio frequency integrated circuit (RFIC) connected to the communication processor, and at least one antenna, each of which is connected to the at least one RFIC via at least one radio frequency front-end (RFFE) circuit, and is configured to transmit and/or receive a signal corresponding to at least one communication network, wherein the communication processor is configured to: identify whether target power corresponding to a primary component carrier (PCC) exceeds maximum transmission power of the electronic device while performing uplink carrier aggregation (CA), and based on identifying that the target power corresponding to the PCC exceeds the maximum transmission power, set a first transmission power of the PCC to a first power less than the maximum transmission power and set a second transmission power of at least one secondary component carrier (SCC) to a second power less than the first power, based on a first spectral efficiency corresponding to the first transmission power of the PCC and a second spectral efficiency corresponding to the second transmission power of the at least one SCC.

According to various example embodiments, the communication processor is configured to: identify the first spectral efficiency by setting the first transmission power of the PCC to a value lower than the maximum transmission power by a first set value, identify the second spectral efficiency by setting the second transmission power of the at least one SCC to a value which is higher by a second set value, and set the first transmission power of the PCC to the first power and set the second transmission power of the at least one SCC to the second power so that a sum of the first spectral efficiency and the second spectral efficiency is maximized.

According to various example embodiments, the communication processor is configured to: perform control so as to repeatedly perform identifying the first spectral efficiency and the second spectral efficiency by adjusting the first transmission power of the PCC and the second transmission power of the at least one SCC by a set value, until the sum of the first spectral efficiency and the second spectral efficiency is maximized.

According to various example embodiments, the first spectral efficiency or the second spectral efficiency may be determined based on a code rate or a modulation order.

According to various example embodiments, the communication processor may be configured to control the electronic device to transmit data corresponding to a physical downlink shared channel (PDSCH) via the PCC.

According to various example embodiments, the communication processor may be configured to: perform control so as to set the first transmission power of the PCC to the maximum transmission power based on identifying that a path loss between the electronic device and a base station is changed to exceed a set value.

According to various example embodiments, the communication processor may be configured to: perform control so as to set the first transmission power of the PCC to the maximum transmission power in response to receiving a configured message from a base station.

According to various example embodiments, the communication processor may be configured to: perform control so as to set the first transmission power of the PCC based on the maximum transmission power based on identifying that a sounding reference signal (SRS) is transmitted via the PCC.

According to various example embodiments, the communication processor may be configured to perform control so as to set the first transmission power of the PCC based on the maximum transmission power based on identifying that a modulation and coding scheme (MCS) of the PCC is less than or equal to a set value.

According to various example embodiments, the first spectral efficiency or the second spectral efficiency may include an uplink data rate of the electronic device.

A method according to any one of various example embodiments may include: activating an uplink carrier aggregation (CA), identifying whether a target power corresponding to a primary component carrier (PCC) exceeds a maximum transmission power of the electronic device while performing uplink CA, and based on identifying that the target power corresponding to the PCC exceeds the maximum transmission power, setting the first transmission power of the PCC to a first power less than the maximum transmission power and setting the second transmission power of at least one secondary component carrier (SCC) to a second power less than the first power, based on a first spectral efficiency corresponding to the first transmission power of the PCC and a second spectral efficiency corresponding to the at least one SCC.

According to various example embodiments, the method may include: identifying the first spectral efficiency by setting the first transmission power of the PCC to a value which is lower than the maximum transmission power by a first set value, and identifying the second spectral efficiency by setting the second transmission power of the at least one SCC by a second set value, and setting the first transmission power of the PCC to the first power and setting the second transmission power of the at least one SCC to the second power so that a sum of the first spectral efficiency and the second spectral efficiency is maximized.

According to various example embodiments, the method may include: identifying the first spectral efficiency and the second spectral efficiency by adjusting the first transmission power of the PCC and the second transmission power of the at least one SCC by a set value, until the sum of the first spectral efficiency and the second spectral efficiency is maximized.

According to various example embodiments, the first spectral efficiency or the second spectral efficiency may be determined based on a code rate or a modulation order.

According to various example embodiments, the method may further include: transmitting data corresponding to a physical downlink shared channel (PDSCH) via the PCC.

According to various example embodiments, the method may include: setting the first transmission power of the PCC to the maximum transmission power based on identifying that a path loss between the electronic device and a base station is changed to exceed a set value.

According to various example embodiments, the method may include: setting the first transmission power of the PCC to the maximum transmission power in response to receiving a configured message from a base station.

According to various example embodiments, the method may include: setting the first transmission power of the PCC based on the maximum transmission power based on identifying that a sounding reference signal (SRS) is transmitted via the PCC.

According to various example embodiments, the method may include: setting the first transmission power of the PCC based on the maximum transmission power based on identifying that a modulation and coding scheme (MCS) of the PCC is less than or equal to a set value.

According to various example embodiments, the first spectral efficiency or the second spectral efficiency may include an uplink data rate of the electronic device.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the various example embodiment(s) described herein may be used in conjunction with any other example embodiment(s) described herein.

What is claimed is:

1. An electronic device comprising:
   a communication processor;
   at least one radio frequency integrated circuit (RFIC) connected to the communication processor; and
   at least one antenna, each of which is connected to the at least one RFIC via at least one radio frequency front-end (RFFE) circuit, and is configured to transmit or receive a signal corresponding to at least one communication network,
   wherein the communication processor is configured to:
   identify whether target power corresponding to a primary component carrier (PCC) exceeds maximum transmission power of the electronic device while performing uplink carrier aggregation (CA), and
   based on identifying that the target power corresponding to the PCC exceeds the maximum transmission power, set a first transmission power of the PCC to a first power less than the maximum transmission power and set a second transmission power of at least one secondary component carrier (SCC) to a second power less than the first power, based on a first spectral efficiency corresponding to the first transmission power of the PCC and a second spectral efficiency corresponding to the second transmission power of the at least one SCC.

2. The electronic device of claim 1, wherein the communication processor is configured to:
   identify the first spectral efficiency by setting the first transmission power of the PCC to a value lower than the maximum transmission power by a first set value,
   identify the second spectral efficiency by setting the second transmission power of the at least one SCC to a value higher by a second set value, and
   set the first transmission power of the PCC to the first power and set the second transmission power of the at least one SCC to the second power so that a sum of the first spectral efficiency and the second spectral efficiency is maximized.

3. The electronic device of claim 2, wherein the communication processor is configured to: perform control to repeatedly perform identifying the first spectral efficiency and the second spectral efficiency by adjusting the first transmission power of the PCC and the second transmission power of the at least one SCC by a set value, until the sum of the first spectral efficiency and the second spectral efficiency is maximized.

4. The electronic device of claim 1, wherein the first spectral efficiency or the second spectral efficiency is determined based on a code rate or a modulation order.

5. The electronic device of claim 1, wherein the communication processor is configured to control the electronic device to transmit data corresponding to a physical downlink shared channel (PDSCH) via the PCC.

6. The electronic device of claim 1, wherein the communication processor is configured to perform control to set the first transmission power of the PCC to the maximum transmission power based on identifying that a path loss between the electronic device and a base station is changed to exceed a set value.

7. The electronic device of claim 1, wherein the communication processor is configured to perform control to set the first transmission power of the PCC to the maximum transmission power in response to receiving a configured message from a base station.

8. The electronic device of claim 1, wherein the communication processor is configured to perform control to set the first transmission power of the PCC based on the maximum transmission power based on identifying that a sounding reference signal (SRS) is transmitted via the PCC.

9. The electronic device of claim 1, wherein the communication processor is configured to perform control to set the first transmission power of the PCC based on the maximum transmission power based on identifying that a modulation and coding scheme (MCS) of the PCC is less than or equal to a set value.

10. The electronic device of claim 1, wherein the first spectral efficiency or the second spectral efficiency comprises an uplink data rate of the electronic device.

11. A method of controlling a transmission power in an electronic device, the method comprising:
    activating an uplink carrier aggregation (CA);
    identifying whether a target power corresponding to a primary component carrier (PCC) exceeds a maximum transmission power of the electronic device while performing uplink CA; and based on identifying that the target power corresponding to the PCC exceeds the maximum transmission power, setting the first transmission power of the PCC to a first power less than the maximum transmission power and setting the second transmission power of at least one secondary component carrier (SCC) to a second power less than the first power, based on a first spectral efficiency corresponding to the first transmission power of the PCC and a second spectral efficiency corresponding to the at least one SCC.

12. The method of claim 11, comprising:

identifying the first spectral efficiency by setting the first transmission power of the PCC to a value lower than the maximum transmission power by a first set value, and identifying the second spectral efficiency by setting the second transmission power of the at least one SCC by a second set value; and setting the first transmission power of the PCC to the first power and setting the second transmission power of the at least one SCC to the second power so that a sum of the first spectral efficiency and the second spectral efficiency is maximized.

13. The method of claim 12, comprising:

identifying the first spectral efficiency and the second spectral efficiency by adjusting the first transmission power of the PCC and the second transmission power of the at least one SCC by a set value, until the sum of the first spectral efficiency and the second spectral efficiency is maximized.

14. The method of claim 11, wherein the first spectral efficiency or the second spectral efficiency is determined based on a code rate or a modulation order.

15. The method of claim 11, further comprising:

transmitting data corresponding to a physical downlink shared channel (PDSCH) via the PCC.

16. The method of claim 11, further comprising:

setting the first transmission power of the PCC to the maximum transmission power based on identifying that a path loss between the electronic device and a base station is changed to exceed a set value.

17. The method of claim 11, further comprising:

setting the first transmission power of the PCC to the maximum transmission power in response to receiving a configured message from a base station.

18. The method of claim 11, further comprising:

setting the first transmission power of the PCC based on the maximum transmission power based on identifying that a sounding reference signal (SRS) is transmitted via the PCC.

19. The method of claim 11, further comprising:

setting the first transmission power of the PCC based on the maximum transmission power based on identifying that a modulation and coding scheme (MCS) of the PCC is less than or equal to a set value.

20. The method of claim 11, wherein the first spectral efficiency or the second spectral efficiency comprises an uplink data rate of the electronic device.

* * * * *